(12) United States Patent
Lee et al.

(10) Patent No.: US 9,288,648 B2
(45) Date of Patent: Mar. 15, 2016

(54) TRANSPORT STREAM PACKET GENERATION DEVICE AND METHOD OF GENERATING TRANSPORT STREAM PACKET THEREOF

(71) Applicant: SAMSUNG ELECTRONICS CO., LTD., Suwon-si, Gyeonggi-do (KR)

(72) Inventors: Shin-Won Lee, Hwaseong-si (KR); Jian Gao, Seoul (KR); Pyoungjae Jung, Seoul (KR); Junyoung Cho, Suwon-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 284 days.

(21) Appl. No.: 13/935,877

(22) Filed: Jul. 5, 2013

(65) Prior Publication Data

US 2014/0016548 A1    Jan. 16, 2014

(30) Foreign Application Priority Data

Jul. 11, 2012    (KR) .................. 10-2012-0075588

(51) Int. Cl.
*H04W 4/18* (2009.01)
*H04N 7/28* (2006.01)
*H04N 21/236* (2011.01)
*H04N 21/2368* (2011.01)

(52) U.S. Cl.
CPC ............. *H04W 4/18* (2013.01); *H04N 21/2368* (2013.01); *H04N 21/23605* (2013.01)

(58) Field of Classification Search
None
See application file for complete search history.

(56) References Cited

U.S. PATENT DOCUMENTS

| 6,310,898 B1 * | 10/2001 | Schwartz ..................... 370/537 |
| 6,912,218 B1 | 6/2005 | Jeon |
| 2003/0115381 A1 * | 6/2003 | Coles et al. ..................... 710/1 |
| 2006/0133429 A1 | 6/2006 | Seo et al. |
| 2007/0165676 A1 | 7/2007 | Kato |
| 2008/0098451 A1 | 4/2008 | Kim et al. |
| 2008/0279464 A1 | 11/2008 | Ahn et al. |
| 2010/0091019 A1 | 4/2010 | Ha |
| 2013/0238702 A1 * | 9/2013 | Sheth et al. .................. 709/204 |

FOREIGN PATENT DOCUMENTS

| JP | 2006080715 | 3/2006 |
| JP | 2011082934 | 4/2011 |
| JP | 2011223131 | 11/2011 |
| JP | 2012-015722 | 1/2012 |
| KR | 1020070061224 | 6/2007 |
| KR | 1020080008928 | 1/2008 |
| KR | 1020090086660 | 8/2009 |

* cited by examiner

*Primary Examiner* — Charles C Jiang
*Assistant Examiner* — George Atkins, Jr.
(74) *Attorney, Agent, or Firm* — F. Chau & Associates, LLC

(57) ABSTRACT

A method of generating a transport stream (TS) packet in a data transmitting device includes receiving a packetized elementary stream (PES) packet and generating at least two TS packets among a plurality of TS packets corresponding to the PES packet at a time on a basis of an analysis result of the PES packet.

8 Claims, 10 Drawing Sheets

Fig. 3

| Packet Start Code Prefix | Stream ID | PES Packet Length | PES Packet Data |

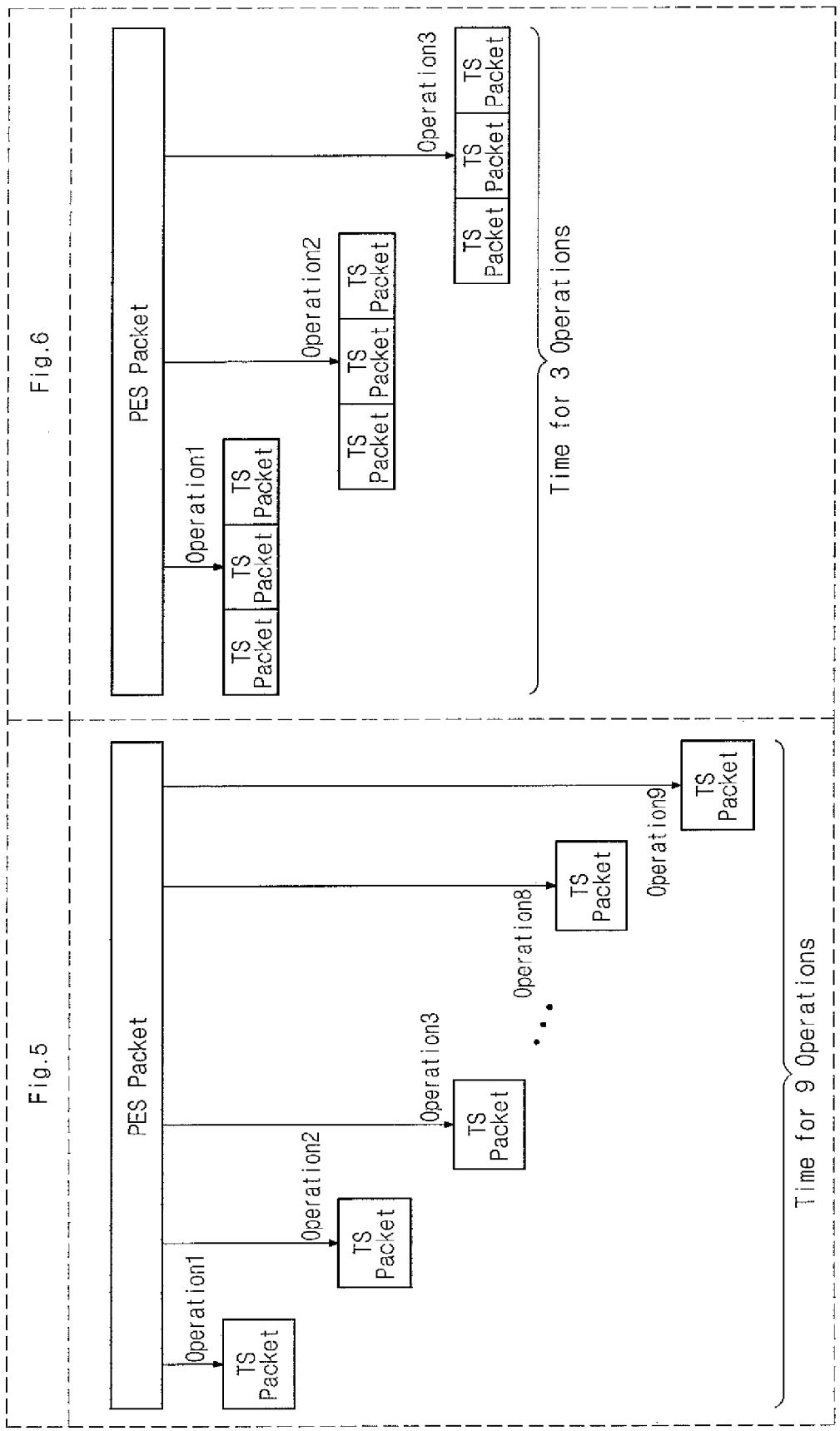

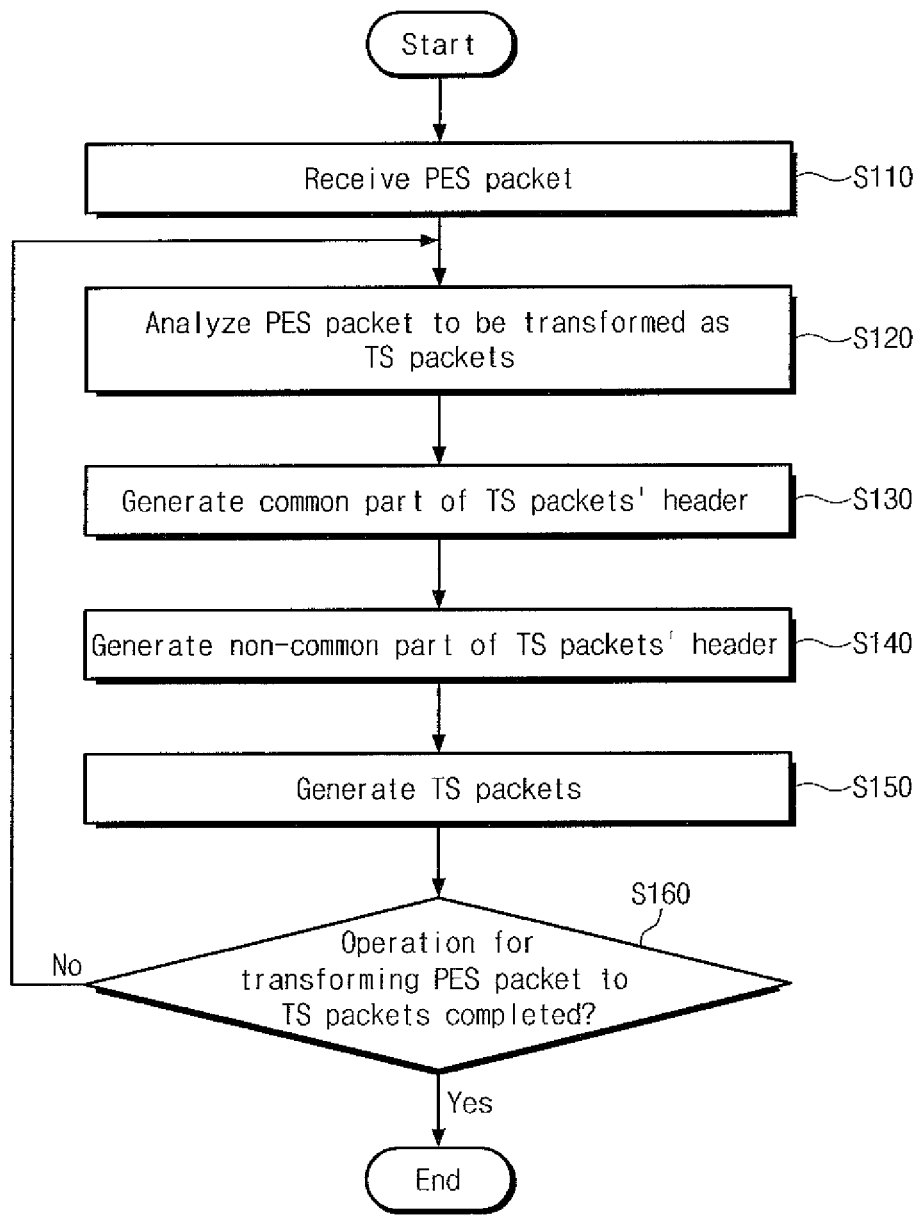

TRANSPORT STREAM PACKET GENERATION DEVICE AND METHOD OF GENERATING TRANSPORT STREAM PACKET THEREOF

CROSS-REFERENCE TO RELATED APPLICATIONS

This application claims priority under 35 U.S.C. §119 of Korean Patent Application No. 10-2012-0075588, filed on Jul. 11, 2012, the disclosure of which is hereby incorporated by reference herein in its entirety.

TECHNICAL FIELD

The present disclosure relates to image compression technologies, and more particularly, to a transport stream (TS) packet generation device used in an image compression technology and a method of generating a transport stream packet thereof.

DISCUSSION OF THE RELATED ART

To transmit an image through a wireless or wire network, an image compression technology is frequently used. Among image compression technologies, an image compression technology using a system affiliated with a moving picture expert group (MPEG) is particularly used frequently. Examples of the system affiliated with the MPEG include but are not limited to a MPEG-1 system, a MPEG-2 system, a MPEG-3 system, a MPEG-4 system, a MPEG-7 system and a MPEG-21 system. In the system affiliated with the MPEG, image information is transformed into transport stream (TS) packets and the TS packets are transmitted from a transmitting device to a receiving device.

An image compression technology is frequently used when transmitting or receiving an image in a digital broadcasting. Due to development of technology such as Wi-Fi, Wi-Di, etc. these days, an image compression technology is used frequently when transmitting an image being played in a smart phone to a high definition television (HDTV) in real time.

SUMMARY

Embodiments of the inventive concept provide a method of generating a transport stream (TS) packet in a data transmitting device. The method may include receiving a packetized elementary stream (PES) packet and generating at least two TS packets among a plurality of TS packets corresponding to the PES packet at a time on a basis of an analysis result of the PES packet.

Embodiments of the inventive concept also provide a transport stream (TS) packet generation device. The TS packet generation device may include a TS analyzing part configured to receive a packetized elementary stream (PES) packet and configured to analyze the PES packet and a TS packet generating part configured to generate a plurality of TS packets corresponding to the PES packet on a basis of an analysis result of the PES packet. The TS packet generating part is configured to generate at least two TS packets during one TS packet generating operation.

Exemplary embodiments of the inventive concept also provide a display system which includes a first display device configured to generate a plurality of transport stream (TS) packets at one TS packet generating operation which correspond to a packetized elementary stream (PES) packet generated by the first display device and configured to multiplex the generated TS packets to thereby generate a plurality of multiplexed TS packets therefrom, a second display device; and a wireless network. The first and second display device are operatively connected to each other through the wireless network, and the first display device is configured to transmit information about an image being displayed to the second display device. The second display device is configured to process information about the corresponding image and display the same image as the image being displayed in the first display device.

BRIEF DESCRIPTION OF THE DRAWINGS

Exemplary embodiments of the inventive concept can be understood in more detail from the following detailed description taken in conjunction with the accompanying drawings in which:

FIG. 3 is a drawing illustrating a structure of PES packet being used in FIG. 2.

FIG. 9 is a drawing illustrating a TS packet generation operation of the video TS packetizer of FIG. 6 in accordance with an embodiment of the inventive concept.

FIG. 10 is a flow chart explaining an operation of the video TS packetizer of FIG. 6.

DETAILED DESCRIPTION OF EXEMPLARY EMBODIMENTS

Figure 1:
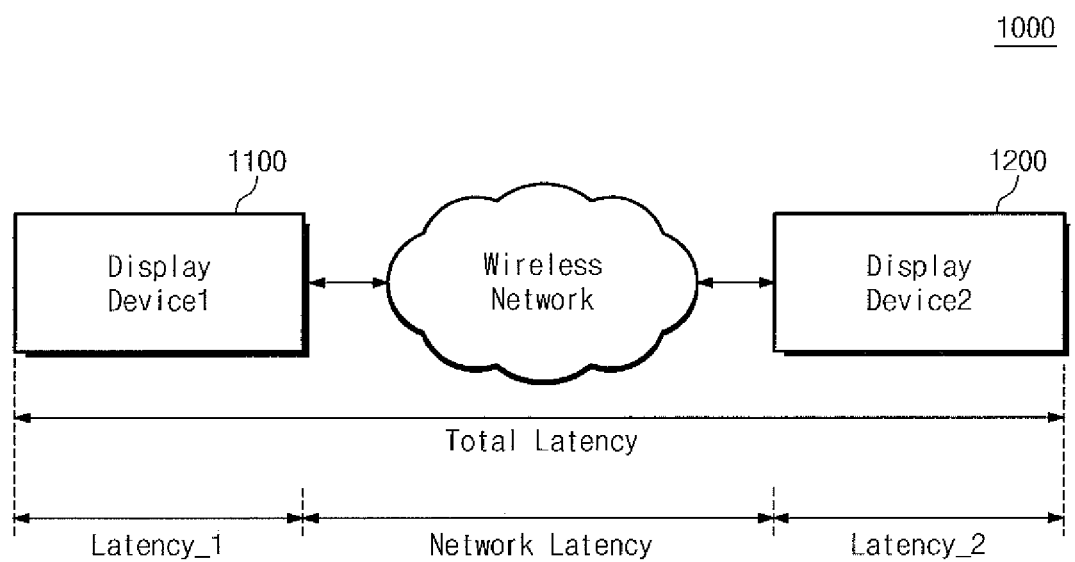
FIG. 1 is a drawing illustrating a display system in accordance with an embodiment of the inventive concept.

Exemplary embodiments of inventive concepts will be described more fully hereinafter with reference to the accompanying drawings, in which exemplary embodiments of the invention are shown. In the drawings, the size and relative sizes of layers and regions may be exaggerated for clarity. Like numbers refer to like elements throughout.

As used herein, the singular forms, "a", "an", and "the" are intended to include plural forms as well, unless the context clearly indicates otherwise.

FIG. 1 is a drawing illustrating a display system 1000 in accordance with some embodiments of the inventive concept. Referring to FIG. 1, the display system 1000 includes, for example, a first display device 1100 and a second display device 1200. The first and second display devices 1100 and 1200 exchange image information through, for example, a wireless network.

The first and second display devices 1100 and 1200 provide, for example, the same image to a user. The first display device 1100, for example, transmits information about an image being displayed to the second display device 1200. The second display device 1200, for example, processes information about the corresponding image and displays the same image as the image being displayed in the first display device 1100.

In this case, as illustrated in FIG. 1, a predetermined time difference exists between the image being displayed in the first display device 1100 and the image being displayed in the second display device 1200. The time difference may be called a total latency.

For example, the total latency should be limited within a predetermined time so that a viewer feels that the image being displayed in the first display device 1100 and the image being displayed in the second display device 1200 are displayed at the same time. If the total latency is, for example, no greater than about 20 ms, a viewer generally feels that the first and second display devices 1100 and 1200 are being displayed at the same time.

The total latency is divided into, for example, first latency (latency_1), second latency (latency_2) and network latency. The first latency (latency_1), means a time delayed by an operation of the first display device 1100. The second latency (latency_2) means a time delayed by an operation of the second displayed device 1200. The network latency means a time delayed during a transmission of wireless network.

In an embodiment of the inventive concept, the first display device 1100 generates, for example, a plurality of TS packets at a time and thereby the first latency can be shortened. The first display device 1100 generates the plurality of TS packets at a time using, for example, a single instruction multiple data (SIMD) engine. This means that the first display device 1100 can shorten the first latency as compared with a display device generating TS packets one at a time.

Thus, the display system 1000 in accordance with an embodiment of the inventive concept can limit the total latency within a predetermined time. A viewer can feel that the image being displayed in the first display device 1100 and the image being displayed in the second display device 1200 are displayed at the same time.

The first and second display devices 1100 and 1200 may be embodied by various electronic devices. For example, when a user wants for an image being displayed in a small electronic device to be displayed in a large screen at the same time, the first display device 1100 may be embodied by a comparatively small mobile device and the second display device 1200 may be embodied by a comparatively large electronic device.

For instance, the first display device 1100 may be embodied by an iPhone® mobile digital device, a smart phone such as a Samsung Galaxy®, a tablet PC such as an iPad® and a Samsung Galaxy Tab®, or a general notebook computer. The second display device 1200 may be embodied by, for example, a high definition television (HDTV) or a large screen and may be embodied by the same electronic device as the first display device 1100.

The wireless network may be embodied using, for example, an Ethernet, a wireless local area network (WLAN), etc. or may be embodied through a wireless fidelity (Wi-Fi) technology or a Bluetooth technology. The wireless network may be embodied using, for example, a wireless display (Wi-Di) technology. It may be apparent to those skilled in the art that the display system 1000 in accordance with an embodiment of the inventive concept belongs to a Wi-Di standard.

Figure 2:
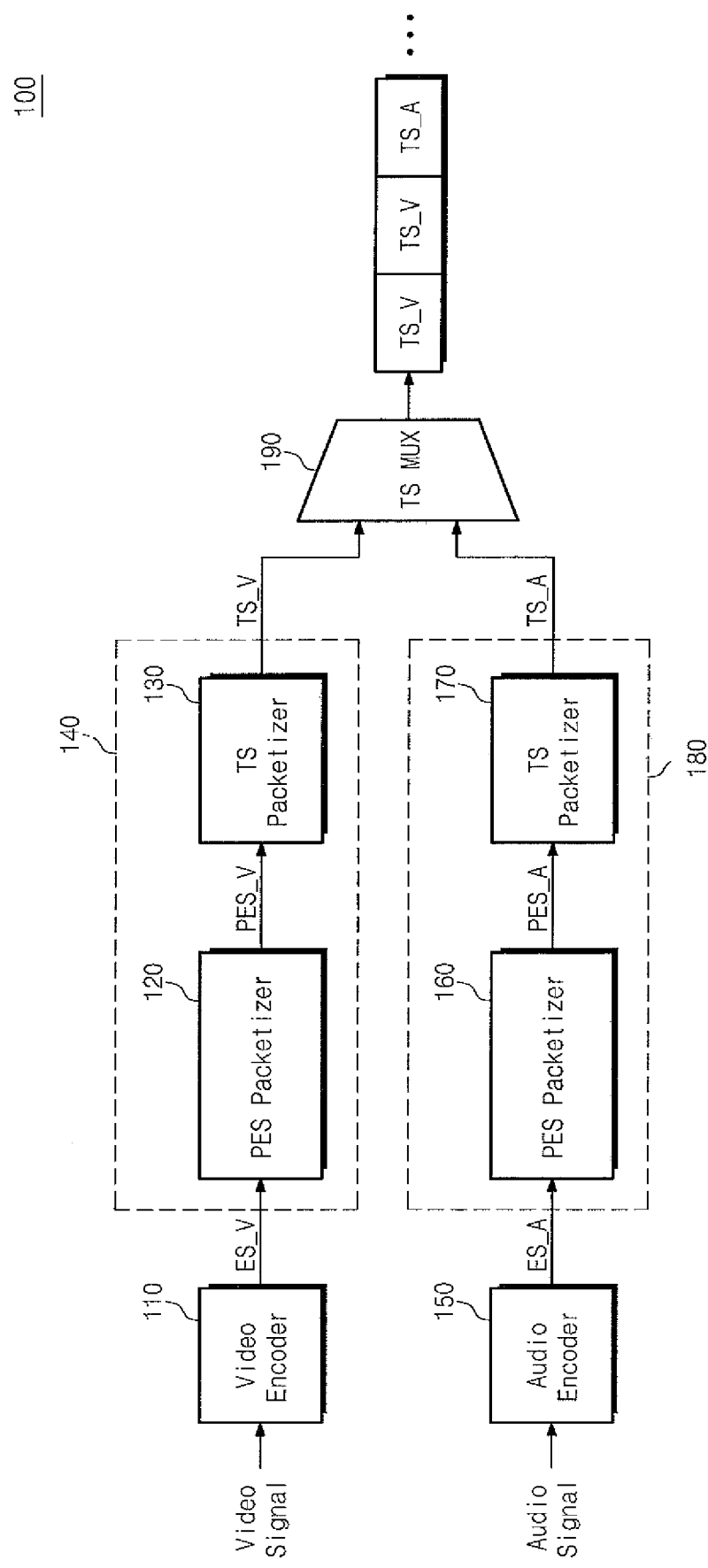
FIG. 2 is a drawing illustrating a data transmitting device in accordance with an embodiment of the inventive concept.

FIG. 2 is a drawing illustrating a data transmitting device 100 in accordance with an embodiment of the inventive concept. The data transmitting device 100 of FIG. 2 may be used as a data transmitting device of the first display device 1100 of FIG. 1. Referring to FIG. 2, the data transmitting device 100 includes, for example, a video encoder 110, a video packetizer 140, an audio encoder 150, an audio packetizer 180 and a TS multiplexer 190.

The video encoder 110, for example, receives a video signal and encodes the received video signal. The encoded video signal may be called a video-elementary stream (ES_V). Similarly, the audio encoder 150, for example, receives an audio signal and outputs an audio-elementary stream (ES_A).

The video packetizer 140, for example, receives the video-elementary stream (ES_V) and packetizes the received video-elementary stream (ES_V). The video packetizer 140 includes, for example, a video PES packetizer 120 and a video TS packetizer 130.

The video PES packetizer 120, for example, receives the video-elementary stream (ES_V) and packetizes the received video-elementary stream (ES_V) to generate a video packetized elementary stream (PES) packet (PES_V). The video PES packetizer 120, for example, cuts the video-elementary stream (ES_V) by a variable size, and then attaches a header to the cut video-elementary stream (ES_V) to generate the video PES packet (PES_V). The video PES packet (PES_V) generated by the video PES packetizer 120 may have, for example, a structure like FIG. 3. A structure of the video PES packet (PES_V) will be described in FIG. 3 in more detail.

The video TS packetizer 130, for example, receives the video PES packet (PES_V) and packetizes the received video PES packet (PES_V) to generate a plurality of video TS packets (TS_V). The video TS packetizer 130, for example, cuts the video PES packet (PES_V) by a fixed size, and then attaches a header to the cut video PES packet (PES_V) to generate a plurality of video TS packets (TS_V). The video TS packets (TS_V) generated by the video TS packetizer 130 may have a structure like FIG. 4. A structure of the video TS packets (TS_V) will be described in FIG. 4 in more detail.

The audio packetizer 180, for example, receives the audio-elementary stream (ES_A) and packetizes the received audio-elementary stream (ES_A). The audio packetizer 180 includes, for example, an audio PES packetizer 160 and an audio TS packetizer 170. A structure and an operation of the audio PES packetizer 160 and the audio TS packetizer 170 are similar to those of the video PES packetizer 120 and the video TS packetizer 130. Therefore, a detailed description will be omitted.

The TS multiplexer 190, for example, receives the video TS packets (TS_V) and the audio TS packets (TS_A) from the video packetizer 140 and the audio packetizer 180, respectively. The TS multiplexer 190, for example, multiplexes the video TS packets (TS_V) and the audio TS packets (TS_A) and transmits the multiplexed TS packets through the wireless network.

In an embodiment of the inventive concept, the video TS packetizer 130, for example, generates headers of the plurality of video TS packets (TS_V) from one video PES packet at a time. The video TS packetizer 130 generates the plurality of video TS packets at a time by, for example, combining the headers of the plurality of video TS packets (TS_V) with payloads. The video TS packetizer 130 in accordance with an embodiment of the inventive concept can shorten the first latency by generating the plurality of video TS packets at a time.

Similarly, the audio TS packetizer 170, for example, generates the plurality of audio TS packets (TS_A) from one audio PES packet at a time. As a constitution and an operation of the audio TS packetizer 170 are similar to those of the video TS packetizer 130, for convenience of description, a constitution and an operation of the video TS packetizer 130 will be mainly described.

As structures of the video PES packet (PES_V) and the audio PES packet (PES_A) are similar, the video PES packet (PES_V) will be mainly described. Also, as structures of the video TS packet (TS_V) and the audio TS packet (TS_A) are similar, the video TS packet (TS_V) will be mainly described. For convenience of description, the video PES packet (PES_V) and the video TS packet (TS_V) will be called a PES packet and a TS packet.

Figure 4:
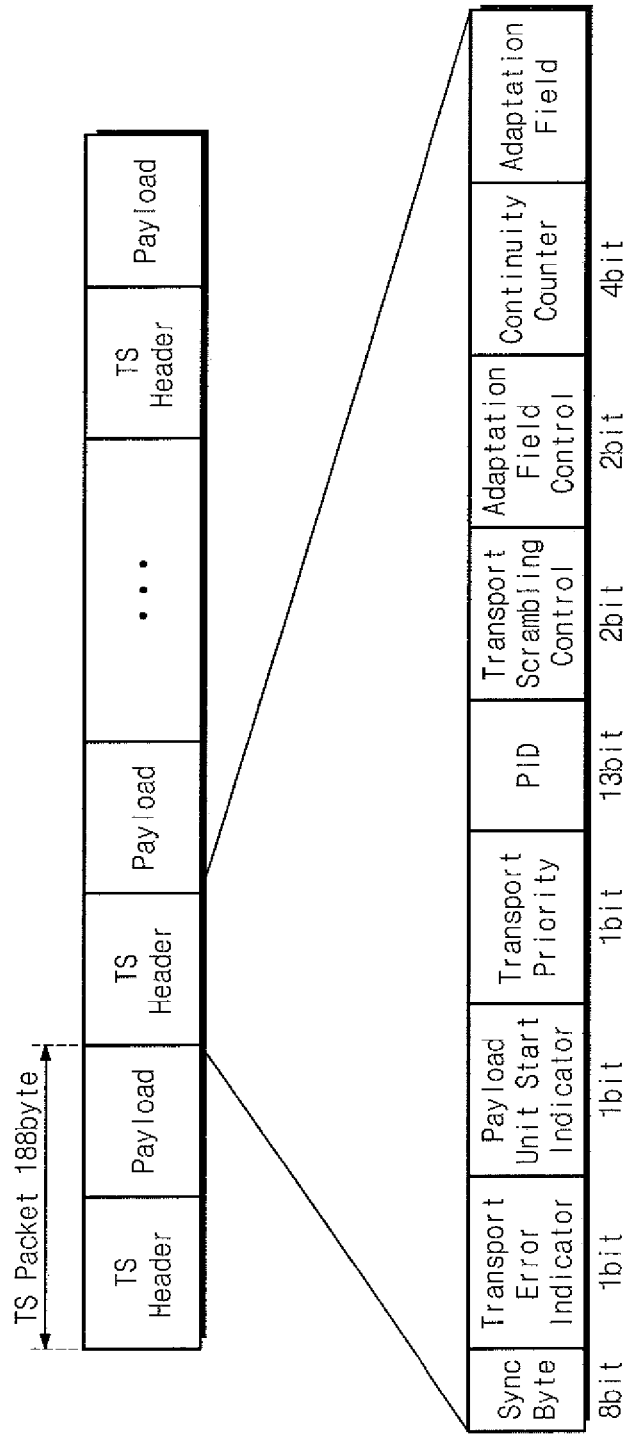
FIG. 4 is a drawing illustrating a structure of TS packet being used in FIG. 2.

FIG. 3 is a drawing illustrating a structure of PES packet being used in FIG. 2. FIG. 4 is a drawing illustrating a structure of TS packet being used in FIG. 2.

Referring to FIG. 3, the PES packet includes a packet start code prefix (hereinafter PSCP), a stream ID, a PES packet length and a PES packet data. As well known, the PSCP and the stream ID are used to judge whether or not a scramble channel exists, the PES packet length is used to express a length of the PES packet and the PES packet data is used to store data about image information. The PSCP, the stream ID, the PES packet length may be called a PES header.

The video PES packetizer 120 can, for example, generate the PES packet of FIG. 3 by variably cutting the video ES (ES_V), and then attaching a PES header to the cut video-elementary stream (ES_V). The PES packet has a variable size. For example, the PES packet may have a size of about 2 kilobytes through about 20 kilobytes.

Referring to FIG. 4, the TS packet includes, for example, a TS header and a payload. The video TS packetizer 130, for example, generates the TS packet of FIG. 4 by fixedly cutting the PBS packet, and then attaching a TS header to the cut PES packet. The TS packet has, for example, a fixed size of about 188 bytes. The TS header has, for example, a fixed size of about 4 bytes and the payload has a fixed size of about 184 bytes.

The TS header includes, for example, a sync byte, a transport error indicator, a payload unit start indicator, a transport priority, a PID, a transport scrambling control, an adaptation field control, a continuity counter and an adaptation field. As each part constituting the TS header are understood by those of ordinary skill in the art, a detailed description is omitted.

Figure 5:
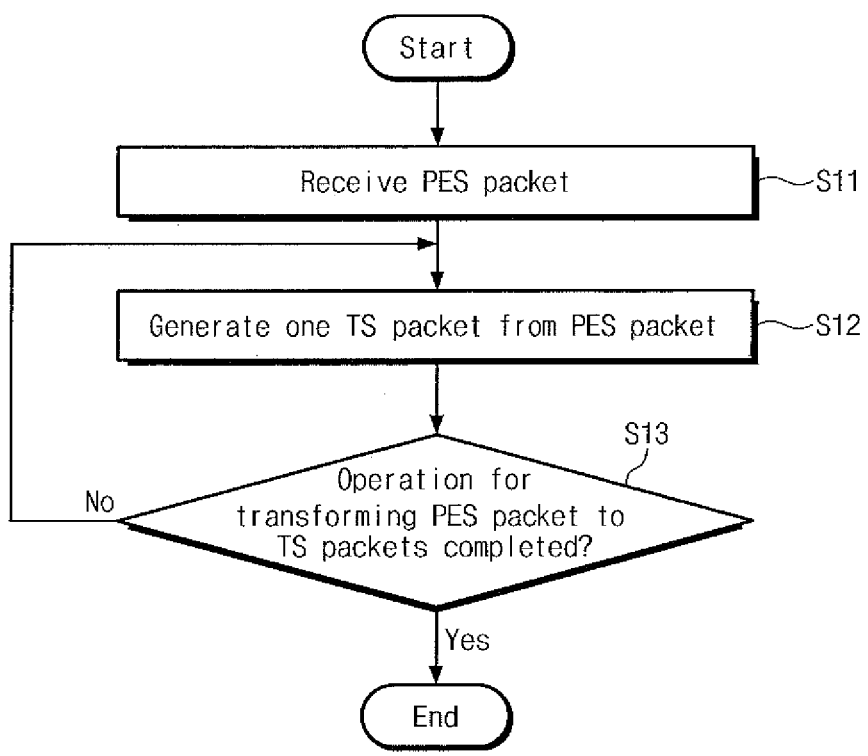
FIG. 5 is a flow chart explaining an operation of generating a TS packet in a general case.

FIG. 5 is a flow chart explaining an operation of generating a TS packet in a general case. As illustrated in FIG. 5, in a general case, one TS packet is generated by one TS packet generating operation.

In a step S11, a PES packet is received. After that, in a step S12, one TS packet is generated from the received PES packet. In a step S13, it is determined whether or not all the PES packets are transformed into TS packets. If all the PES packets are not transformed into the TS packets, an operation of generating the TS packet is repeatedly performed.

As described in FIG. 5, one TS packet generating operation generates one TS packet. Thus, it may take a lot of time to transform all the PES packets into the TS packets.

Assume that a size of the PES packet is about 20 kilobytes. In this case, as the TS packet has a fixed size of about 188 bytes, to transform all the PES packets into the TS packets, over 100 TS packet generating operations may have to be performed. This means that it may take a lot of time to transform all the PES packets into the TS packets. Further, this long time consumption may hinder real time between the first display device 1100 and the second display device 1200.

To resolve the above difficulty, the video TS packetizer 130 or the audio TS packetizer 170 in accordance with an exemplary of the inventive concept generates a plurality of TS packets through one TS packet generating operation. Thus, as compared with a general case, time when the PES packet is transformed into the TS packet may be shortened.

Figure 6:
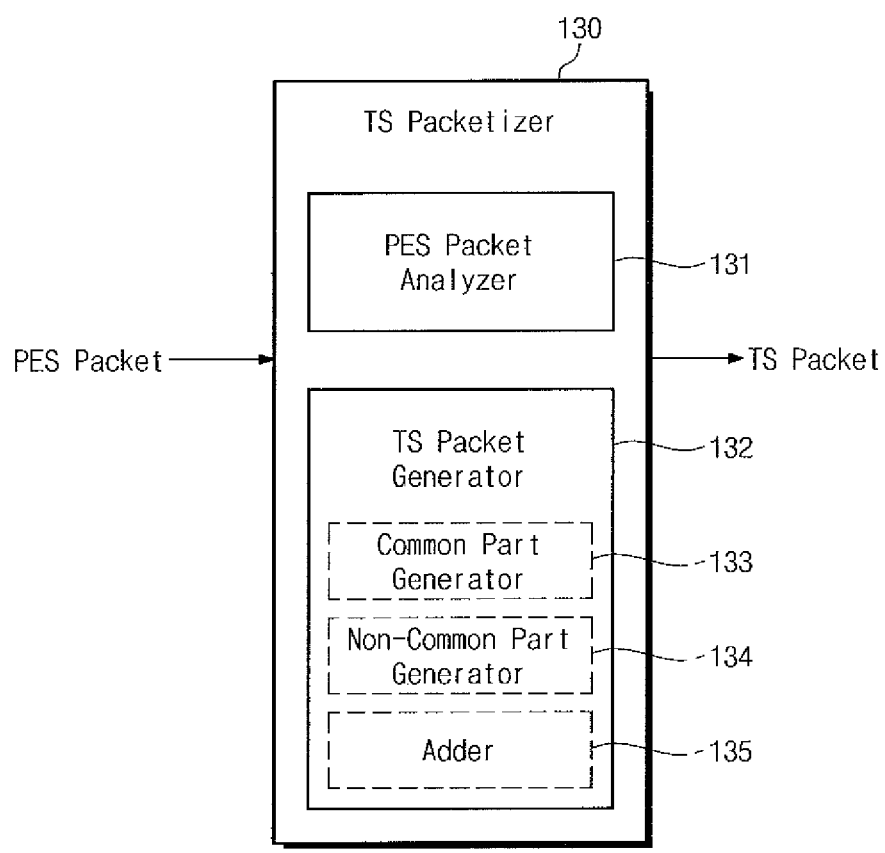
FIG. 6 is a drawing illustrating a structure of a video TS packetizer in detail.

FIG. 6 is a drawing illustrating a structure of a video TS packetizer 130 in detail. Referring to FIG. 6, the video TS packetizer 130 includes, for example, a PES packet analyzer 131 and a TS packet generator 132.

The PES packet analyzer 131, for example, analyzes a PES packet transmitted from the PES packetizer 120. The PES packet analyzer 131 can, for example, see values commonly used in headers of a plurality of TS packets (hereinafter it is referred to as common values) by analyzing the PES packet. By analyzing the PES packet, the PES packet analyzer 131 can see values regularly applied to the headers of the plurality of TS packets (hereinafter it is referred to as regular values) or values irregularly applied to the headers of the plurality of TS packets (hereinafter it is referred to as irregular values).

The TS packet generator 132, for example, generates a plurality of TS packets through one TS packet generating operation on the basis of an analysis result of the PES packet analyzer 131. The TS packet generator 132 includes, for example, a common part generator 133, a non-common part generator 133 and an Adder 135.

The common part generator 133, for example, receives the common values from the PES packet analyzer 131. The common part generator 133, for example, generates constitutions having the same values among constitutions of the headers of the plurality of TS packets using the common values.

Figure 7:
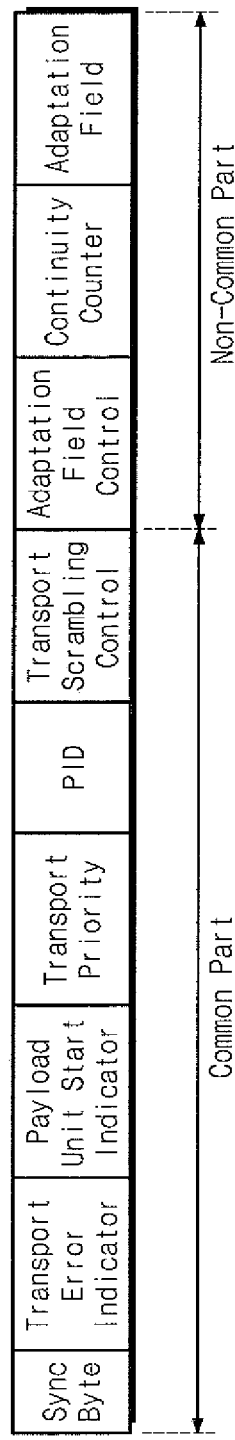
FIG. 7 is a drawing illustrating a structure of a TS header being generated in FIG. 6.

For example, referring to FIG. 7, a predetermined part of the headers of the plurality of TS headers being generated from one PES packet has the same value. When a plurality of TS packets is generated from one PES packet, sync byte values of the plurality of TS headers are same. As illustrated in FIG. 7, a predetermined part of the TS headers having the same value may be called a common part. The common part may include, for example, at least one of a sync byte, a transport error indicator, a payload unit start indicator, transport priority, a PID and a transport scrambling control.

Referring to FIG. 6 again, the non-common part generator 134, for example, receives the regular values and the irregular values. The non-common part generator 134, for example, generates constitutions having different values among constitutions of the headers of the plurality of TS packets using the regular values and the irregular values.

For example, referring to FIG. 7, when a plurality of TS packets is generated from one PES packet, a continuity counter has a value increasing one by one. In this case, the non-common part generator 134 can generates continuity counter values which will be applied to the plurality of TS headers using the regular values. The non-common part generator 134 can, for example, generate an adaptation field control and an adaptation field which will be applied to the plurality of TS headers using the irregular values. The adaptation field control, the continuity counter and the adaptation field may be called a non-common part.

Referring to FIG. 6 again, the adder 135, for example, combines the common part generated from the common part generator 133 and the non-common part generated from the non-common part generator 134 to generate headers of a plurality of TS packets. The adder 135 generates a plurality of TS packets by, for example, combining the plurality of TS headers and a plurality of payloads.

The TS packet generator 132 in accordance with an embodiment of the inventive concept can generate a plurality of TS packets through, for example, one TS packet generating operation.

In FIG. 6, the TS packet generator 132 includes, for example, a hardware constitution of the common part generator 133, the non-common part generator 134 and the adder 135. This is only an illustration and exemplary embodiments of the inventive concept are not limited thereto. The TS packet generator 132 may be embodied using, for example, single instruction multiple data (SIMD) engine. In this case, the common part generator 133, the non-common part generator 134 and the adder 135 of the TS packet generator 132 may be embodied by, for example, software which the SIMD engine performs.

In an embodiment of the inventive concept, the audio TS packetizer 170 of FIG. 2 may be embodied to have, for example, the same structure as the video TS packetizer 130 of FIG. 6.

Figure 8:
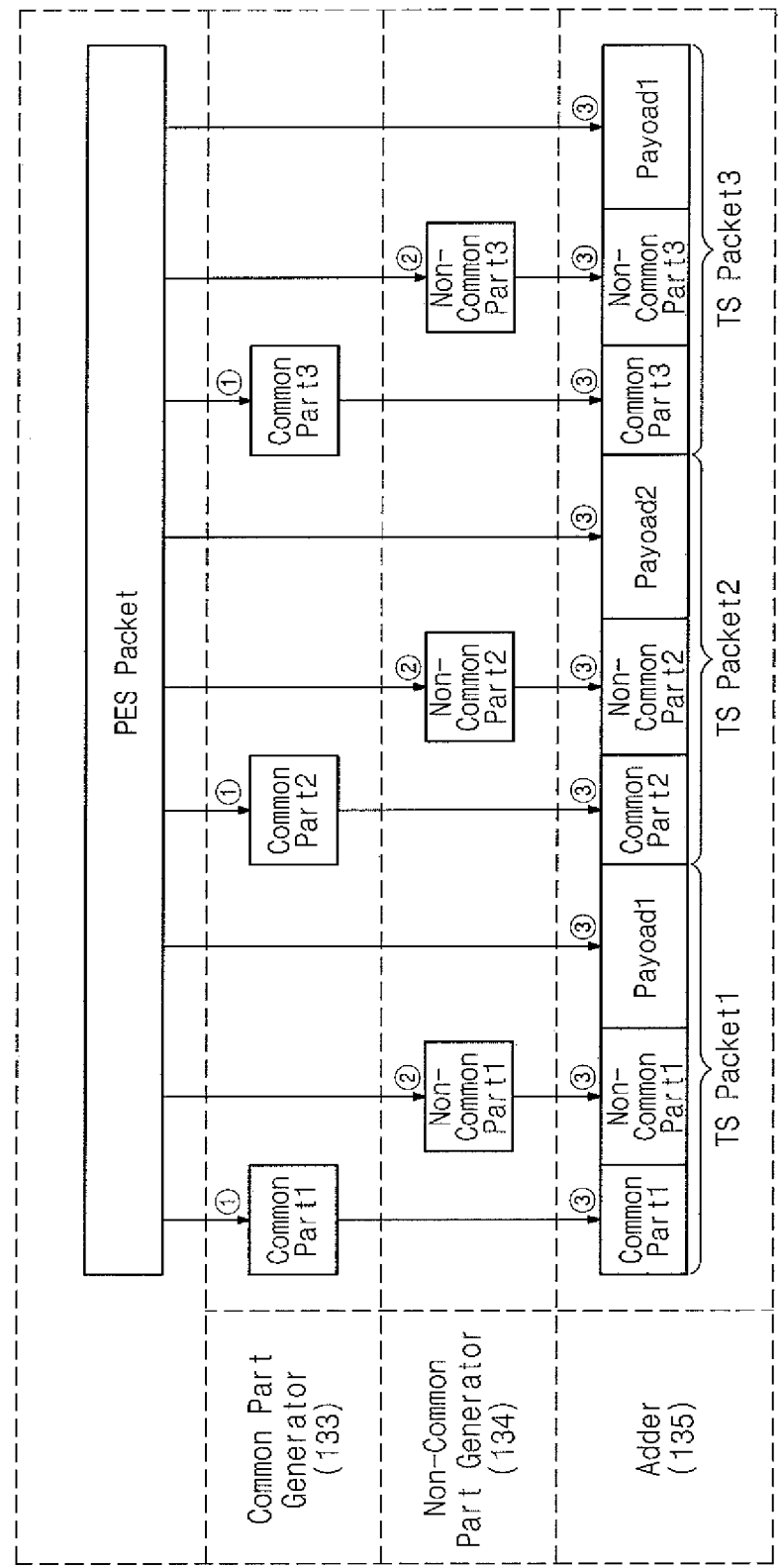
FIG. 8 is a drawing illustrating a TS packet generation operation of the video TS packetizer of FIG. 6 in accordance of an embodiment of the inventive concept.

FIG. 8 is a drawing illustrating a TS packet generation operation of the video TS packetizer of FIG. 6 in accordance with an exemplary embodiment of the inventive concept. For a brief description, it is assumed that, for example, three TS packets correspond to one PES packet. Also, it is assumed that the video TS packetizer 130 generates, for example, three TS packets by one TS packet generating operation.

Referring to FIG. 8, if a TS packet operation begins, the common part generator 133 generates first through third common parts (common part1~common part3) from a PES packet. The first through third common parts (common part1~common part3) have the same value.

The non-common part generator 134 generates first through third non-common parts (non-common part1~non-common part3) from a PES packet. The first through third non-common parts (non-common part1~non-common part3) have different values.

The adder 135 generates TS headers of first through third TS packets (TS packet1~TS packet3) at the same time by combining the first through third common parts (common part1~common part3) with the first through third non-common parts (non-common part1~non-common part3). The adder 135 generates first through third TS packets (TS packet1~TS packet3) by combining the first through third TS headers with the first through third payloads (payload1~payload3).

FIG. 9 is a drawing illustrating a TS packet generation operation of the video TS packetizer 130 of FIG. 6 in accordance with an exemplary embodiment of the inventive concept. For a brief description, it is assumed that one PES packet corresponds to nine TS packets. It is assumed that the video TS packetizer 130 generates, for example, three TS packets by one TS packet generating operation.

Referring to FIG. 9, the video TS packetizer 130 generates three TS packets by one TS packet generating operation. Thus, the video TS packetizer 130 can transform all the PES packets into the TS packets by three TS packet generating operations.

In a general case, as described in FIG. 5, one TS packet is generated by one TS packet generating operation. Thus, as illustrated in FIG. 9, to transform all the PES packets into the TS packets, nine TS packet generating operations have to be performed.

The video TS packetizer 130 or the audio TS packetizer 170 in accordance with an exemplary embodiment of the inventive concept generates a plurality of TS packets through one TS packet generating operation and thereby time when the PES packets are transformed into the TS packets may be shortened as compared with the general case.

FIG. 10 is a flow chart explaining an operation of the video TS packetizer of FIG. 6.

In a step S110, the video TS packetizer 130 receives a PES packet from the video PES packetizer 120.

In a step S120, the PES packet analyzer 131 analyzes the PES packet. The PES packet analyzer 131 can draw common values, regular values and irregular values by analyzing the PES packet.

In a step S130, the common part generator 133 of the TS packet generator 132 generates a common part of a plurality of TS packets on the basis of the common values received from the PES packet analyzer 131.

In a step S140, the non-common part generator 134 of the TS packet generator 132 generates a non-common part of a plurality of TS packets on the basis of the regular values and the irregular values received from the PES packet analyzer 131.

In a step S150, the adder 135 of the TS packet generator 132 generates headers of the plurality of TS packets by combining the common part and the non-common part. The adder 135 generates a plurality of TS packets by combining the plurality of TS packets and a plurality of payloads.

In a step S160, it is judged whether or not all the PES packets are transformed into the TS packets. If all the PES packets are not transformed into the TS packets, a TS packet generating operation is repeatedly performed.

Exemplary embodiments of the inventive concept are not limited to the aforementioned descriptions are illustrations. For example, in FIG. 1, exemplary embodiments of the inventive concept may be applied to a technology that the same image is displayed in a different display device in real time. This is only an illustration and exemplary embodiments of the inventive concept may be applied to various fields. For example, exemplary embodiments of the inventive concept may be applied to a transmitting device and a receiving device of a digital broadcasting using systems MPEG-1 and MPEG-2 affiliated with MPEG.

Having described exemplary embodiments of the inventive concept, it is further noted that it is readily apparent to those of ordinary skill in the art that various modifications may be made without departing from the spirit and scope of the invention which is defined by the metes and bounds of the appended claims.

What is claimed is:

1. A method of generating a transport stream (TS) packet in a data transmitting device comprising:
   receiving a packetized elementary stream (PES) packet; and
   generating at least two TS packets among a plurality of TS packets corresponding to the PES packet at a time on a basis of an analysis result of the PES packet,
   wherein generating at least two TS packets at a time comprises:
   generating TS headers of at least the two TS packets at a time on the basis of the analysis result of the PES packet; and
   generating at least the two TS packets by combining the TS headers with corresponding payloads,
   wherein the generating of the TS headers at a time comprises:
   generating a common part area of the TS headers on a basis of an analysis result of a common value among the analysis results of the PES packet; and
   generating a non-common part area of the TS headers on a basis of a counter value and a value other than a counter value among the analysis results of the PES packet.

2. The method of claim 1, wherein the common part area comprises at least one of a sync byte, a transport error indicator, a payload unit indicator, a transport priority, a PID and a transport scrambling control.

3. The method of claim 1, wherein the non-common part area comprises at least one of an adaptation field control, a continuity counter and an adaptation field.

4. The method of claim 3, wherein the continuity counter corresponds to the regular value and wherein the adaptation field control and the adaptation field correspond to the irregular value.

5. A transport stream (TS) packet generation device comprising:
 a TS analyzing part configured to receive a packetized elementary stream (PES) packet and configured to analyze the PES packet; and
 a TS packet generating part configured to generate a plurality of TS packets corresponding to the PES packet on a basis of an analysis result of the PES packet,
 wherein the TS packet generating part is configured to generate at least two TS packets during one TS packet generating operation,
 wherein the TS packet generating part comprises:
 a common part generator configured to generate a common part area of TS headers of at least the two TS packets on the basis of the analysis result of the PES packet; and
 a non-common part generator configured to generate a non-common part area of TS headers of at least the two TS packets on the basis of the analysis result of the PES packet.

6. The TS packet generation device of claim 5, wherein the common part generator is configured to set up at least one of a sync byte, a transport error indicator, a payload unit indicator, transport priority, a PID and a transport scrambling control as the common part area.

7. The TS packet generation device of claim 5, wherein the non-common part generator is configured to set up at least one of an adaptation field control, a continuity counter and an adaptation field as the non-common part area.

8. The TS packet generation device of claim 5, wherein the TS packet generating part further comprises an adder configured to generate the TS headers of at least the two TS packets by combining the common part area and the non-common part area.

\* \* \* \* \*